United States Patent [19]

Stanley et al.

[11] 4,276,330

[45] Jun. 30, 1981

[54] TRILAMINATE FILM FOR FORMING SIDEWELD BAGS

[75] Inventors: Hugh E. Stanley, Lafayette; George M. Tokos, San Leandro, both of Calif.

[73] Assignee: Crown Zellerbach Corporation, San Francisco, Calif.

[21] Appl. No.: 845,526

[22] Filed: Oct. 26, 1977

Related U.S. Application Data

[63] Continuation of Ser. No. 734,853, Oct. 22, 1976, abandoned.

[51] Int. Cl.³ .................... B32B 27/08; B65D 64/40
[52] U.S. Cl. ........................................ 428/35; 206/484; 206/524.2; 428/332; 428/515; 428/516
[58] Field of Search ............... 428/35, 36, 332, 335, 428/515, 516, 517, 519, 521; 206/484, 524.2; 229/55

[56] References Cited

U.S. PATENT DOCUMENTS

| | | | |
|---|---|---|---|
| 3,282,729 | 11/1966 | Richardson et al. | 428/516 |
| 3,445,318 | 5/1969 | Brams et al. | 428/517 |
| 3,524,795 | 8/1970 | Peterson | 428/516 |
| 3,649,579 | 3/1972 | Gobran et al. | 428/519 |
| 3,671,383 | 6/1972 | Sakata et al. | 428/516 |
| 3,817,821 | 6/1974 | Gallini | 428/516 |
| 3,993,826 | 11/1976 | Butler et al. | 428/521 |
| 4,004,075 | 1/1977 | Richmond et al. | 526/342 |
| 4,022,646 | 5/1977 | Casey | 156/164 |

*Primary Examiner*—Bruce H. Hess
*Attorney, Agent, or Firm*—Stanley M. Teigland

[57] ABSTRACT

Sideweld bags having strong sidewelds can be made from a trilaminate film comprising a core layer of an ethylene-propylene block copolymer sandwiched between skin layers of polypropylene or an ethylene-propylene random copolymer.

7 Claims, No Drawings

TRILAMINATE FILM FOR FORMING SIDEWELD BAGS

This is a continuation of application Ser. No. 734,853, filed Oct. 22, 1976 now abandoned.

Bakery products, such as bread and buns, and textile products, such as shirts and pillow cases, are typically packaged in so-called sideweld bags. The bags are made from film which is passed through a bag-forming machine in which a hot knife cuts through two overlying layers of the film and simultaneously welds the overlying edges together. The film is usually made from a propylene polymer.

This invention provides an improved film for making sideweld bags. The film is a trilaminate comprising a core layer of an ethylene-propylene block copolymer sandwiched between skin layers of polypropylene or an ethylene-propylene random copolymer. The ethylene content of the block copolymer is from about 5 to 10 mole percent; and of the random copolymer, up to about 4 mole percent. For convenience, the two skin layers are preferably made from the same polymer, but need not be. The random copolymer gives slightly better results as the skin layer, but the homopolymer is less expensive. If desired, the skin layer may be a blend of the random copolymer and the homopolymer.

The core layer accounts for about 30 to 90 percent, preferably 50 to 70 percent, of the thickness of the film. The thickness of each skin layer is from about 5 to 35 percent, preferably 15 to 25 percent, of the thickness of the film. The thicknesses of the skin layers are preferably the same, but need not be. The overall thickness of the film is preferably from about 1 to 2 mils.

The film of this invention can be made in accordance with conventional coextrusion techniques. As is customary in such techniques, the film may include recycled trim. In the practice of this invention the trim, which may be as much as 40 percent of the film, but typically is between 15 and 25 percent, is preferably recycled completely in the core layer. Thus, in the commercial practice of this invention, the core layer would include a minor amount of the polymer of the skin layers blended with the block copolymer.

Bags made from the film of this invention have unexpectedly stronger sidewelds than bags made from single layer films of either the homopolymer, the block copolymer or the random copolymer, as shown in the following examples.

EXAMPLES

Sideweld bags were made on a Schjeldahl bag-forming machine from the following films:

(a) a trilaminate comprising a core layer of an ethylene-propylene block copolymer sandwiched between skin layers of polypropylene. The polypropylene was sold under the designation 1178 by Amoco Chemicals Corp. The block copolymer, sold under the designation 7531 by Hercules, Inc., had an ethylene content between 5 and 10 mole percent and was the homogeneous product resulting from the sequential polymerization of (1) propylene and (2) a mixture of propylene and ethylene in the presence of a stereospecific polymerization catalyst. In other words, the product was made by first homopolymerizing propylene and then introducing ethylene into the polymerization zone while some unpolymerized propylene still remained. In theory, this polymerization process is intended to produce a polymer in which one or more segments of propylene homopolymer alternate with one or more segments of a copolymer of propylene and ethylene, such as represented by the formula $$(AAAAAA\text{-}ABABAB)_n$$

wherein A represents propylene, B represents ethylene, and n is one or more. However, it is not possible to avoid the formation of other polymers, such as homopolymers of propylene and ethylene, so the product is actually an intimate mixture of such other polymers with the intended polymer. The thickness ratio of the layers was 20:60:20.

(b) trilaminate comprising a core layer of the same block copolymer sandwiched between skin layers of an ethylene-propylene random copolymer. The random copolymer, sold by Hercules under the designation SA-861, had an ethylene content between 2 and 4 mole percent. The thickness ratio of the layers was 20:60:20.

(c) a single layer film of the same block copolymer.
(d) a single layer film of the same random copolymer.
(e) a single layer film of the same polypropylene. All films had a thickness of 1.25 mil. The core layer of the trilaminate films included about 20 percent recycled trim. The bags were made at a speed of 80 bags per minute. The knife temperature was 710°–720° F. The strength of the sidewelds of the bags was tested on an Eastman Expansion tester, which is well known in the art for testing the strength of sidewelds. In the test, a band having a width of three inches is placed over two prongs, with a slack of one inch. The prongs are then caused to move apart rapidly, at a predetermined force, to take up the slack. If the bank does not tear from the force of the prongs, it passes the test. If the sideweld ruptures, the band fails the test. Ten samples of each construction were tested at three different pressures. The results are reported in the following table.

| Film Construction | SIDEWELD STRENGTH | | | | | |
|---|---|---|---|---|---|---|
| | 30 PSI | | 35 PSI | | 40 PSI | |
| | Pass | Fail | Pass | Fail | Pass | Fail |
| Single Layer Homopolymer | 0 | 10 | 0 | 10 | 0 | 10 |
| Single Layer Random Copolymer | 0 | 10 | 0 | 10 | 0 | 10 |
| Single Layer Block Copolymer | 2 | 8 | 0 | 10 | 0 | 10 |
| Trilaminate with Skin Layers of Random Copolymer | 10 | 0 | 10 | 0 | 10 | 0 |
| Trilaminate with Skin Layers of Homopolymer | 10 | 0 | 10 | 0 | 8 | 2 |

We claim:
1. A trilaminate film made by coextrusion comprising a core layer sandwiched between skin layers, the core layer having a thickness of from about 30 to 90 percent of the thickness of the film and consisting essentially of an ethylene-propylene block copolymer and up to 40 percent of the weight of the film of recycled trilaminate trim consisting of said core layer and said skin layers, the block copolymer being the homogeneous product resulting from the sequential polymerization of (1) propylene and (2) a mixture of propylene and ethylene in the presence of a stereospecific polymerization catalyst, with the ethylene content of the block copolymer being from about five to ten mole percent, each skin layer having a thickness of from about 5 to about 35 percent of the thickness of the film and consisting essentially of polypropylene or an ethylene-propylene random copolymer having an ethylene content up to about four mole percent.

2. The film of claim 1 having a thickness of from about one to about two mils.

3. The film of claim 1 wherein the core layer has a thickness of from about 50 to 70 percent of the thickness of the film and each skin layer has a thickness of from about 15 to 25 percent of the thickness of the film.

4. The film of claim 3 wherein the thicknesses of the skin layers are the same.

5. The film of claim 4 wherein the skin layers consist essentially of polypropylene.

6. The film of claim 4 wherein the skin layers consist essentially of an ethylene-propylene random copolymer having an ethylene content up to four mole percent.

7. The film of claim 1 in the form of a sideweld bag.

* * * * *